United States Patent [19]

Dunlap

[11] 4,365,475
[45] Dec. 28, 1982

[54] THERMOCHEMICAL ENERGY STORAGE AND MECHANICAL ENERGY CONVERTER SYSTEM

[75] Inventor: Richard M. Dunlap, Middletown, R.I.

[73] Assignee: The United States of America as represented by the Secretary of the Navy, Washington, D.C.

[21] Appl. No.: 182,366

[22] Filed: Aug. 29, 1980

[51] Int. Cl.³ .............................................. F01K 25/10
[52] U.S. Cl. ........................................ 60/673; 60/649; 60/651; 165/104.12
[58] Field of Search ................. 60/649, 673, 671, 651; 165/104.12

[56] References Cited

U.S. PATENT DOCUMENTS

| 4,009,575 | 3/1977 | Hartman et al. | 60/671 |
| 4,085,590 | 4/1978 | Powell et al. | 60/671 |
| 4,161,210 | 7/1979 | Reid et al. | 60/673 |
| 4,314,448 | 2/1982 | Alefeld | 60/649 X |
| 4,319,626 | 3/1982 | Papazian et al. | 165/104.12 |
| 4,319,627 | 3/1982 | Papazian et al. | 165/104.12 |

FOREIGN PATENT DOCUMENTS 1389441  4/1975  United Kingdom ................. 60/673

Primary Examiner—Allen M. Ostrager
Attorney, Agent, or Firm—Robert F. Beers; Arthur A. McGill

[57] ABSTRACT

A thermochemical energy storage and mechanical energy converter system utilizing a turbine. The system has a power or discharge phase, and a reactivate or charge phase. In the power phase ammonia gas is released by $CaCl_2.8NH_3$, expanded in a turbine and combined with $ZnCl_2$ to form $ZnCl_2.NH_3$. In an example of the reactivate phase, ammonia gas is released by $ZnCl_2.NH_3$ and added to $CaCl_2.NH_3$ to form $CaCl_2.8NH_3$.

2 Claims, 4 Drawing Figures

THERMOCHEMICAL ENERGY STORAGE AND MECHANICAL ENERGY CONVERTER SYSTEM

STATEMENT OF GOVERNMENT INTEREST

The invention described herein may be manufactured and used by or for the government of the United States of America for governmental purposes without the payment of any royalties thereon or therefore.

BACKGROUND OF THE INVENTION

The present invention generally relates to an energy supply and more particularly to a power system using energy in chemical form. The supply can be held in readiness for extended periods of time without energy loss.

This is a distinct advantage over thermal energy storage systems that rely on insulation to retain stored energy. An advantage of the present system over an electric storage battery is that only heat is required to recharge the system rather than less readily available electric power.

SUMMARY OF THE INVENTION

It is therefore a general object of the present invention to provide an improved power system. The system operates in a Z-cycle and comprises an intermittent operating thermochemical mechanical energy converter. In the power phase heat is added to an ammoniate $CaCl_2.8NH_3$ and forms an ammoniated salt $CaCl_2.2NH_3$ with the release of ammonia gas that does work by isentropic expansion through an engine. The ammonia forms a second ammoniate $ZnCl_2.2NH_3$ with the release of heat that is returned to the ammoniate $CaCl_2.8NH_3$ to keep the process going. During the reactivation phase heat is added to $ZnCl_2.2NH_3$ and releases ammonia gas to the $CaCl_2.2NH_3$ so that the power phase can be restarted.

DESCRIPTION OF THE PREFERRED EMBODIMENT

Figure 1:
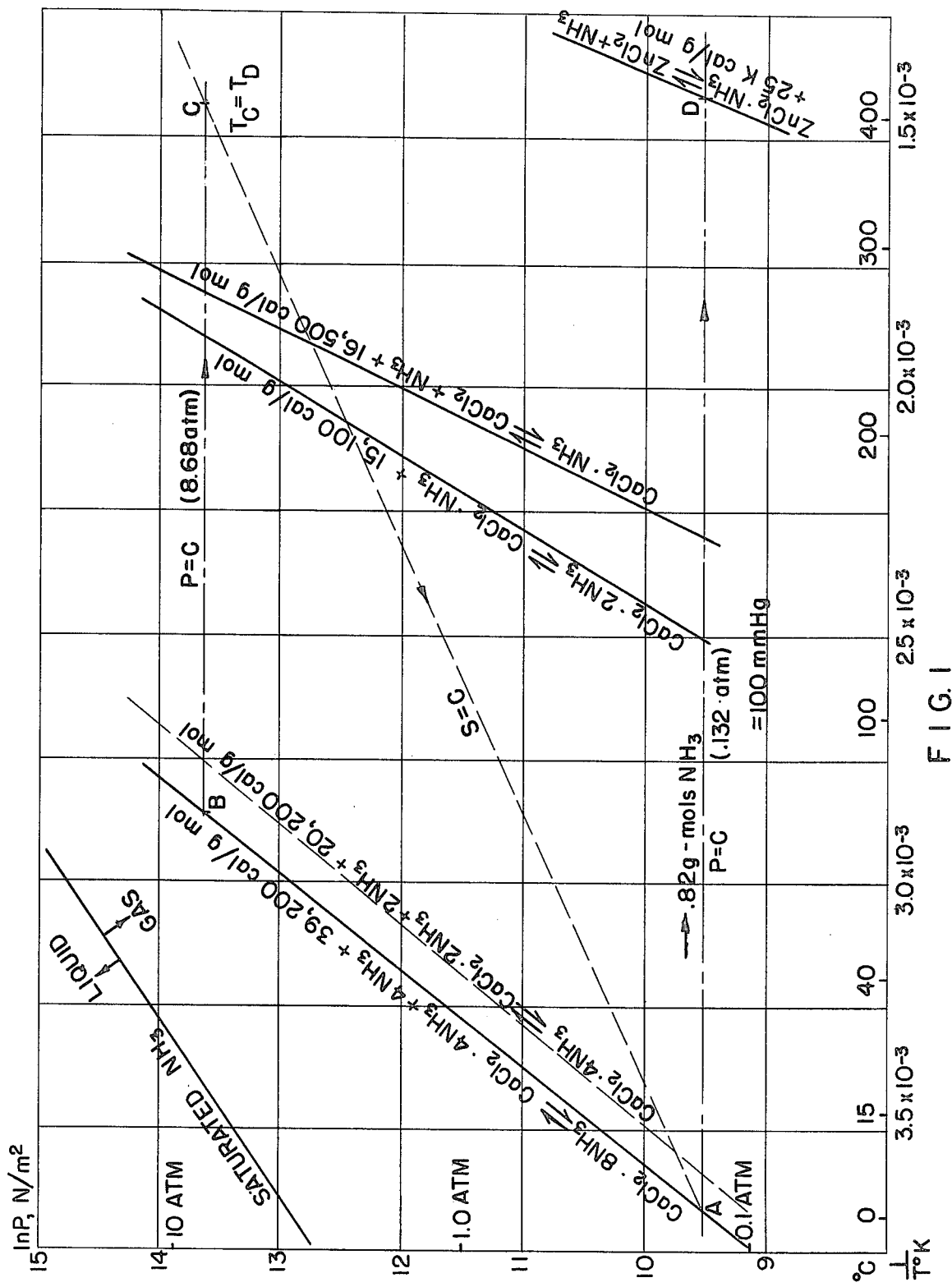
FIG. 1 is a pressure vs. temperature plot showing the Z-cycle in which the present invention operates.

Referring now to FIG. 1 there is shown a Z-cycle in which the present system operates. In the operation of the Z-cycle energy is stored in chemical form by means of an ammoniated salt. When ammonia is added to the salt to form an ammoniate, heat is released. Conversely, the addition of heat to the ammoniate frees ammonia gas. When this is done at high pressure and temperature, and the gas superheated, the gas can be isentropically expanded through an engine or turbine to produce work. When the exhaust is added to another salt, another ammoniate is formed with the release of heat. In our case the heat released by ammoniation of the second salt is sufficient to deammoniate the first ammoniate and superheat both the intake gas to the turbine and the exhaust gas from the turbine.

The process at state A, in FIG. 1, is for example:

$$6NH_3 + CaCl_2.2NH_3 = CaCl_2.8NH_3 + Q_A \tag{1}$$

and at state B:

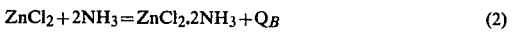

$$ZnCl_2 + 2NH_3 = ZnCl_2.2NH_3 + Q_B \tag{2}$$

For the equation (1) and (2) processes the Clausius-Clapeyron Equation holds; the slope of the lines is $$d(\ln P)/d(T^{-1}) = Q/R \tag{3}$$

where R = universal gas constant

In the cycle A-B-C-A-D work is produced during isentropic expansion from state C to state A. State B to state C and state A to state D are constant pressure superheating processes. State A to state B is essentially a heating process at constant volume. $T_C \leq T_D$. When all of the $ZnCl_2$ is ammoniated to $ZnCl_2.2NH_3$ or when all the $CaCl_2.8NH_3$ is deammoniated to $CaCl_2.2NH_3$ the process ceases. The $CaCl_2$ is in the lower ammoniate state, $CaCl_2.2NH_3$. To re-energize the system, heat is added at a temperature greater than $T_D$ to the $ZnCl_2.2NH_3$ driving off all of the ammonia gas $NH_3$. The ammonia gas $NH_3$ flows from state D to state A where the higher ammoniate $CaCl_2.8NH_3$ is formed. Heat is released at temperature $T_A$ and is rejected to the environment, which must be a lower temperature. The process is now ready to be repeated.

Figure 2:
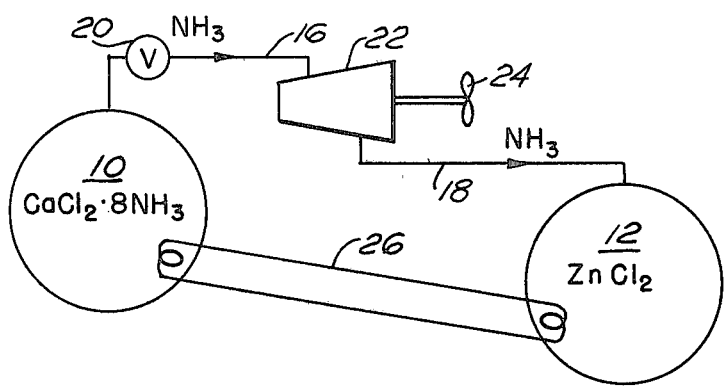
FIG. 2 is a schematic diagram of a system for performing the power phase in accordance with the present invention.

Refer now to FIG. 2 for a system shown schematically that performs the power phase. The system comprises a first reactor 10 containing ammoniate $CaCl_2.8NH_3$ and a second reactor 12 containing zinc chloride $ZnCl_2$. The first and second reactors are connected to each other by the serial combination of piping 16 and 18, valve 20, and turbine 22. The turbine 22 drives a propeller 24.

When valve 20 is opened ammonia gas $NH_3$ flows through piping 16 to turbine 22 where work is produced such as driving the propeller 24. The turbine exhaust gas passes through piping 18 to reactor 12 where the gas combines with the $ZnCl_2$ to produce $ZnCl_2.2NH_3$ and release heat at a high temperature. This heat is transferred by a heat transfer loop to the $CaCl_2.8NH_3$ driving off more $NH_3$ to drive the turbine. The initial pressure in the $CaCl_2$ reactor 10 must be slightly greater than in the $ZnCl_2$ reactor 12 for this bootstrap system to get started.

The process continues until all the $CaCl_2.8NH_3$ has been deammoniated to $CaCl_2.2NH_3$ or all the $ZnCl_2$ has been ammoniated to $ZnCl_2.2NH_3$ or both. During the period both reactors are well insulated.

Figure 3:
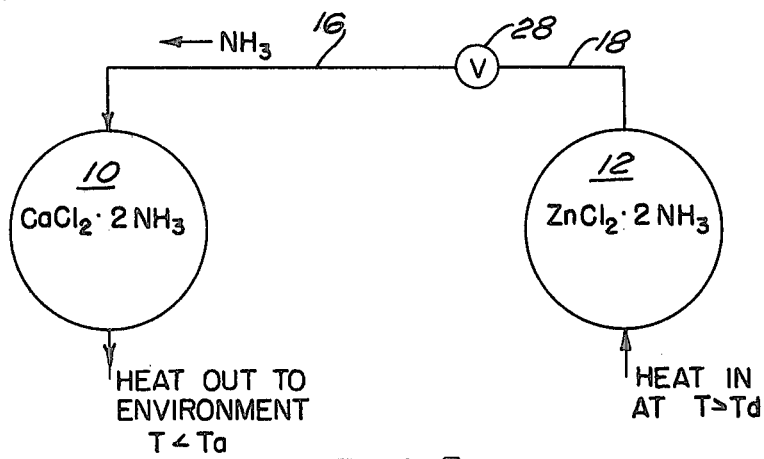
FIG. 3 is a schematic diagram of a system for performing the reactivation phase in accordance with the present invention.

To reactivate or re-energize the system, it is connected as shown in FIG. 3. Heat is added to the reactor 12 containing the $ZnCl_2.2NH_3$. The $ZnCl_2$ is deammoniated and released ammonia gas flows through piping 18 and 16, and opens valve 28 to reactor 10. This produces $CaCl_2.8NH_3$ and releases heat which is rejected to the environment.

Figure 4:
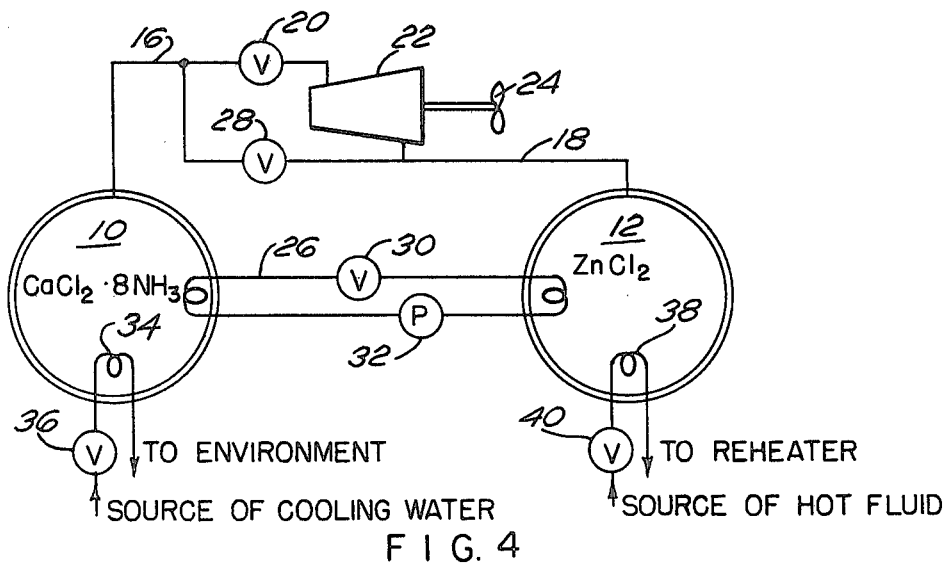
FIG. 4 is a schematic diagram of the complete system in accordance with the present invention.

The processes of power production and reactivation can be carried out in the total system shown in FIG. 4. The system comprising reactors 10 and 12 connected through piping 16 and 18, valves 20 and 28, and the turbine 22 driving propeller 24. The heat transfer loop 26 has a valve 30 and a circulating pump 32. A heat exchanger 34 receives a source of cooling water through valve 36 for reactor 10. A heat exchanger 38 receives a source of hot water or other hot fluid through valve 40.

In operation during the power phase, valves 20 and 30 are open, valves 28, 36 and 40 are closed, and circulating pump 32 is operating. During the reactivation phase valves 20 and 30 are closed, valves 28, 36 and 40 are open, and circulating pump 32 is shutdown.

In operation during the power phase is similar to that described in FIG. 2 with ammonia gas $NH_3$ flowing from reactor 10 to reactor 12 with work being done by turbine 22. The ammonia gas produces $ZnCl_2.2NH_3$ in reactor 12 and releases heat. The heat is transferred back to reactor 10 by the operation of circulating pump 32 in heat transfer loop 28.

Upon completion of the power phase, the reactivation phase lineup of valves is made and the reactivation phase is started. The operation of the reactivation phase is similar to that described in FIG. 3 with ammonia gas flowing from reactor 12 to reactor 10 through valve 28. Heat is added to reactor 12 by heat exchanger 38 and heat is rejected to the atmosphere by heat exchanger 34 following the release of heat from the production of $CaCl_2.8NH_3$ in reactor 10.

There has therefore been described a thermochemical energy storage and mechanical energy converter system utilizing both a power and a charge phase. The charge phase enables the reuse of the system once the original working fluid has been spent.

It will be understood that various changes in details, materials, steps and arrangement of parts, which have been described may be made by those skilled in the art within the principle and scope of the invention as expressed in the appended claims.

What is claimed is:

1. A thermochemical energy storage and mechanical energy converter system comprising:

first means for forming ammoniated calcium chloride with the release of ammonia gas;

second means for receiving ammonia gas from said first means and expending said ammonia gas to provide work;

third means for receiving ammonia gas from said second means and forming ammoniated zinc chloride;

fourth means for transferring heat from said second means to said first means; and fifth means for releasing ammonia gas from said ammoniated zinc chloride and reforming ammoniated calcium chloride.

2. A thermochemical energy storage and mechanical energy converter system according to claim 1 further comprising:

said first means comprises a first reactor;

said second means comprises a turbine connected to said first reactor;

said third means comprises a second reactor connected to said turbine;

said fourth means comprises a first heat exchange loop between said second reactor and said first reactor; and said fifth means comprises said second reactor connected to said first reactor, a second heat exchange loop connecting said first reactor to an outside source and discharge location, and a third heat exchange loop connecting said second reactor to an outside source and discharge location.

* * * * *